United States Patent [19]
Westermann

[11] 3,837,546
[45] Sept. 24, 1974

[54] LIGHTWEIGHT LUGGAGE CARRIER FOR BICYCLES

[76] Inventor: Arthur R. Westermann, 2328 E. Osborn Rd., Phoenix, Ariz. 85016

[22] Filed: June 11, 1973

[21] Appl. No.: 368,978

[52] U.S. Cl. .................................................. 224/35
[51] Int. Cl. ............................................... B62j 7/02
[58] Field of Search ............ 224/35, 30 R, 31, 32 R; 40/129 C, 129 R

[56] References Cited
UNITED STATES PATENTS

| | | | |
|---|---|---|---|
| 444,642 | 1/1891 | Allen et al. | 224/35 |
| 1,121,366 | 12/1914 | Hurrell | 224/35 |
| 1,362,162 | 12/1920 | Bradley | 224/35 |

*Primary Examiner*—Robert G. Sheridan
*Assistant Examiner*—Jerold M. Forsberg
*Attorney, Agent, or Firm*—Warren F. B. Lindsley

[57] ABSTRACT

A lightweight, detachably mounted luggage carrier for bicycles formed from one or more pieces of flexible material which, when associated with the frame of a bicycle, forms luggage carrying compartments with openings thereto.

7 Claims, 3 Drawing Figures

LIGHTWEIGHT LUGGAGE CARRIER FOR BICYCLES

BACKGROUND OF THE INVENTION

This invention relates to luggage carriers attachable to the triangular frame of a conventional bicycle for transporting personal items of the user such as, for example, articles of clothing and the like.

FIELD OF THE INVENTION

This invention is particularly directed to a lightweight luggage container or carrier preferably fabricated of a single piece of flexible material, such as canvas, leather or vinyl, and adapted to be hung over the horizontal bar of a bicycle frame. Mating sides of the carrier are attached by lacing or other suitable means to the angular bars of the frame to form luggage carrying compartments with access means thereto for storing items needed by the rider.

DESCRIPTION OF THE PRIOR ART

Heretofore many kinds of luggage carriers for bicycles have been devised and utilized for carrying various articles, such as tools, school books, clothing and the like, all attached to some part of the bicycle frame. A few of such containers have been designed to be removably attached to the horizontal bar of a bicycle and allowed to hang down in the open triangular space formed between the horizontal bar and the upwardly extending angular bars of the bicycle frame. The lower ends of such carrier were usually secured to the angular bars of the frame by clips.

Some of these luggage carriers have been fabricated of hard materials such as metal or rigid plastic and because the space between the bicycle rider's knees when operating the pedals is limited to approximately 6 inches, anything placed between his legs must be four inches thick or less to avoid interference with his operation of the bicycle. Containers of this nature are usually too bulky and are expensive to fabricate because they consist of several parts which require forming, welding and other extensive operations during their manufacture.

In order to obviate the above disadvantages, a new and improved lightweight luggage container or carrier is provided which is inexpensive to manufacture and which may be easily and quickly installed in the open triangular space formed between the horizontal and angular bars of a bicycle frame. The claimed device provides a closed compartment, the interior of which is accessible from without to allow the placement of luggage therein or to remove the same therefrom with a minimum of effort, and which does not interfere with the normal operation of the bicycle or cause injury to the rider.

SUMMARY OF THE INVENTION

It is, therefore, one object of this invention to provide an improved lightweight luggage carrier for bicycles.

Another object of this invention is to provide an improved lightwieght luggage carrier or container for bicycles which is adapted to be hung over the top horizontal tie bar of the bicycle frame and designed to substantially occupy the triangular open space formed by the frame members of the bicycle.

A further object of this invention is to provide an improved luggage carrier or container for bicycles that can be fabricated from a single piece of material shaped to form a pair of depending integral opposed side pieces when the central portion of the single formed piece of material is hung over the top horizontal bar of the bicycle frame. The depending side pieces are sized and shaped to partly surround and mate with the upward and outwardly angled bars of the bicycle frame to which they are attached to form a closed compartment between their sides.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
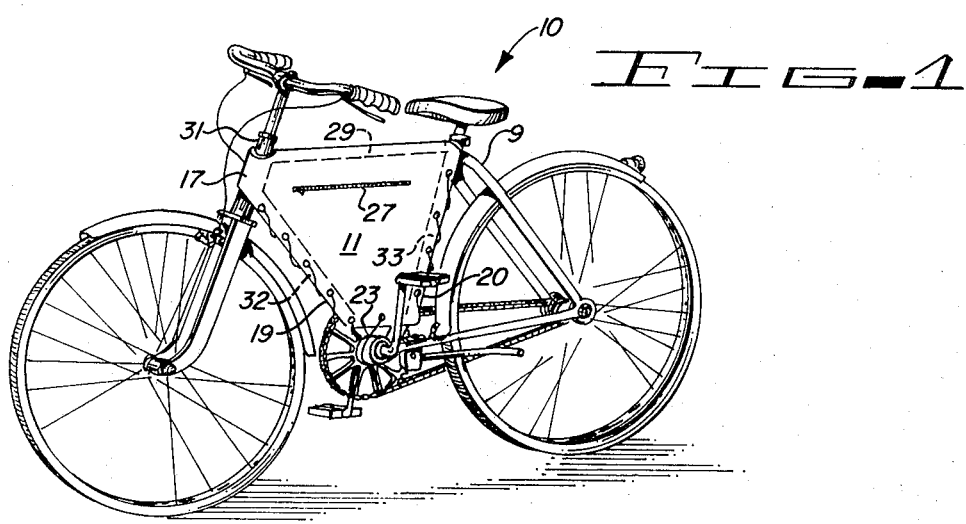
FIG. 1 is a perspective view of a "man's type" bicycle, looking from the front left side and showing the luggage carrier of this invention installed on the bicycle frame.
Figure 2:
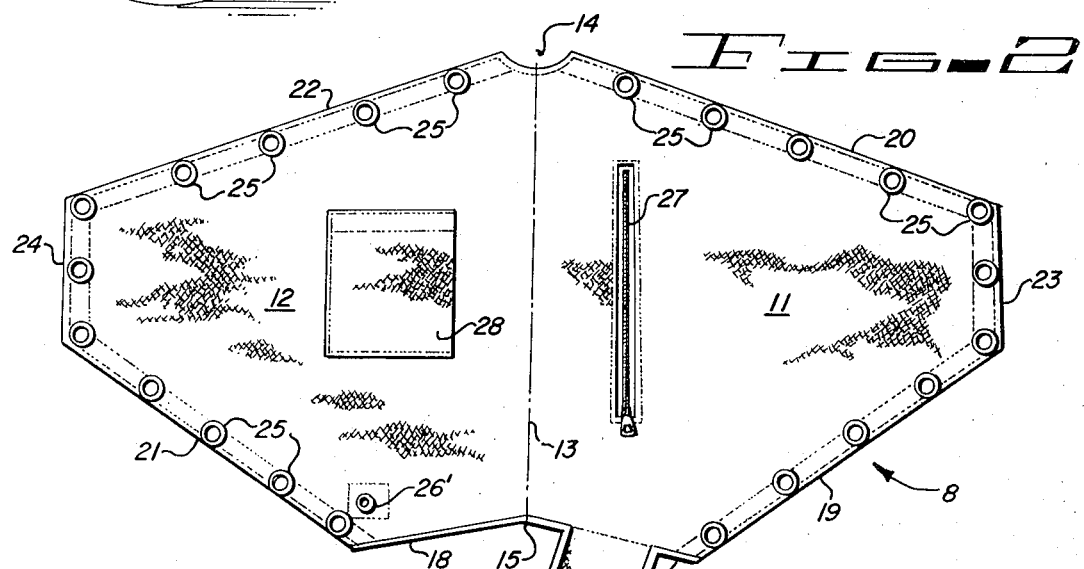
FIG. 2 is a plan view of the luggage container or carrier of this invention in unfolded flat position showing the peripheral contour of the one piece structure with the central dividing line indicated in dotted line.
Figure 3:
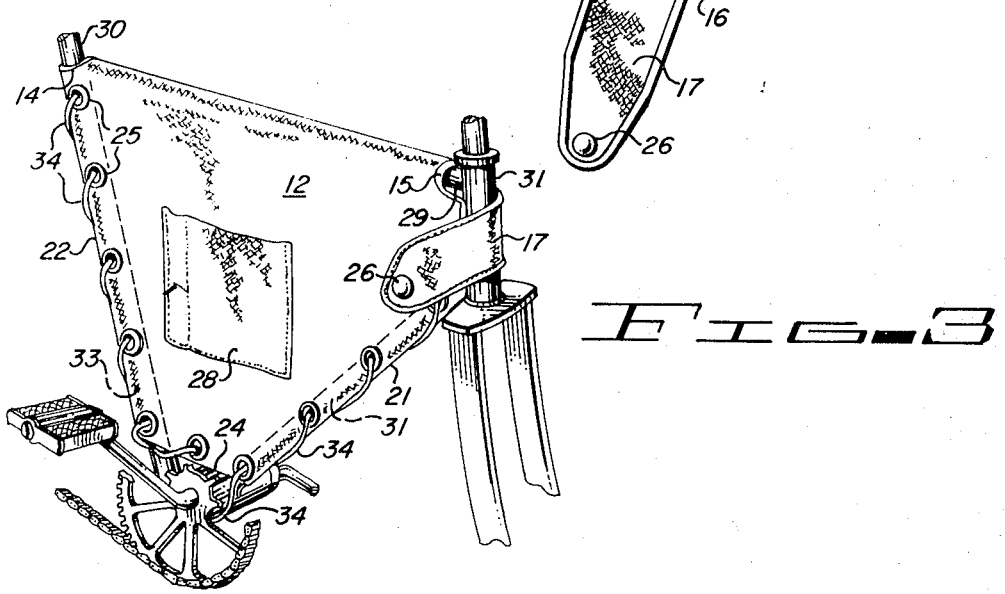
FIG. 3 is an enlarged fragmentary perspective view of the bicycle of FIG. 1, looking from the front right side and further illustrating the luggage carrier of this invention installed on the bicycle frame.

Referring more particularly to the drawing by characters of reference, FIGS. 1–3 disclose a luggage container or carrier 8 of this invention attached to a frame 9 of a conventional man's type bicycle 10.

The luggage carrier 8 is preferably cut and fabricated from a single piece of somewhat flexible material such as canvas, leather or vinyl which is shaped to provide a matched pair of left and right hand triangular side panels 11 and 12, respectively. These panels are shown as being divided from each other by an imaginary longitudinal center line 13 (indicated by dash lines in FIG. 2) which passes through a concave cut-out 14 at the rear end of the material and a similarly shaped contoured portion 15 at the front end. The contoured portion 15 defines an edge 16 on the left hand side panel 11, as shown in FIG. 2, having a forwardly extending integral flap or tongue portion 17 interspersed between its ends. The contour portion 15 continues on the right hand side panel 12 as an outwardly extending edge 18.

The triangular side panels 11 and 12 are further formed by the downwardly extending front and rear edges 19, 20 and 21, 22, respectively, as shown in FIGS. 1 and 3, interconnected at their lower ends by edges 23 and 24, thereby completing the formation of the side panels.

The edges 19, 20, 21, 22, 23 and 24 forming the triangular contour of the side panels 11 and 12 are preferably hemmed or turned over on themselves and stitched or cemented together to strengthen their edges. Each edge is provided with a plurality of apertures spaced along its length which are reinforced by metal or plastic eyelets 25 to mate in opposed relationship with corresponding apertures along the other panel when the panels are folded on the imaginary centerline 13 to lie juxtapositioned to each other. The edges of the cut-out contoured portions 14 and 15, the outwardly extending angles 16 and 18, and the tongue 17 may also be hemmed or suitably bound to prevent fraying and further strengthen the material of the structure.

Tongue 17, which is an integral extension of the side panel 11, is provided at its outer end with the male portion 26 of a snap fastener. The female portion 26' of the snap fastener is secured to the side panel 12 adjacent the intersection of the edges 18 and 21 in position to mate with each other when the tongue is wrapped around the front steering post portion of the bicycle frame.

The left hand side panel 11 is provided with a longitudinal slit or access opening which is adjacent and parallel to the imaginary center or folding line 13. It may be left open or provided with a conventional zipper 27. The right hand side panel 12 is provided with an open pocket 28.

The installation of the lightweight, one-piece luggage carrier of this invention on the frame of a conventional man's type bicycle requires only a quick and simple procedure consisting of folding the material on the imaginary center line 13 and placing it over the top horizontal tie bar 29 of the bicycle frame with the concave cut-out 14 partially surrounding the seat support bar 30. The contoured concave portion 15 partially surround the front joint of the tie bar 29 and the steering post portion 31 at the front of the frame, allowing the left and right hand side panels 11 and 12 to hang straight down form the tie bar. The zippered access opening or slit 27 and the open pocket 28 are exposed on their respective sides.

Having accomplished the above, it will be evident that the front edges 19 and 21 of the hemmed material will mate and partially surround the forward angular bar 32 of the bicycle frame. The rear edges 20 and 22 of the hemmed material will mate and partially surround the rear angular bar 33 of the frame with the parallel longitudinal positioned edges 23 and 24 aligning with each other on opposite sides of the bicycle frame. Thus a substantially triangular-shaped enclosure is formed between the respective bars of the bicycle frame, the side panels 11 and 12 of which may be maintained in tightly closed relationship by simply lashing or lacing the respective side panels together and to the angular bars 32 and 33 of the bicycle frame by threading suitable lacing material such as rawhide strips or nylon cord 34 through the mating eyelets 25 and around the frame members and knotting or otherwise securing the lacing at each end, as shown in FIGS. 1 and 3.

To further secure the luggage carrier 8 to the bicycle frame and to prevent its top portion from sliding rearwardly on the horizontal tie bar 29 of the bicycle frame, tongue 17 is wrapped around the steering post portion 31 of the frame and secured to the right hand side panel 12 by snap fastener elements 26 and 26'.

It will thus be evident from the foregoing description that a lightweight luggage carrier has been formed from a single piece of flexible material that can be quickly and easily installed on or removed from the frame of a bicycle. This carrier is adapted to form a triangularly shaped enclosure having an access opening on one side thereof for inserting and/or removing articles such as school books, clothing or other items therefrom and an open pocket on the other side for carrying various small items. The carrier does not interfere with the normal operation of the bicycle or present the possibility of injury to the operator of the bicycle.

Although this invention has been described as being especially applicable to a man's type bicycle, that is, one with the solid horizontal tie bar which joins the front and rear sections of the frame, it is conceivable that the luggage carrier could be installed and utilized on a "ladies' type" bicycle which is devoid of a horizontal tie bar. This can be accomplished by supplying with the luggage carrier kit a lightweight tie bar which can be removably attached to the front and rear portions of the bicycle frame. This bar would support the luggage carrier of this invention in similar manner to that described above for a man's type bicycle.

Although the carrier has been shown with eyelets 25, lacing or cord 34 and snap fasteners 26, 26', it should be recognized that other suitable fasteners may be used such as zippers to interlock the cooperating edges of the carrier and still fall within the scope of this invention.

It should be recognized that the luggage carrier may be formed of one piece of material cut to the form shown in FIG. 2 or from a number of pieces suitably secured together to form that configuration. Further, various types of fasteners may be used as well as the openings and pockets shown may be arranged in different positions on the carrier.

Although but one embodiment of the present invention has been illustrated and described, it will be apparent to those skilled in the art that various changes and modifications may be made therein without departing from the spirit of the invention or from the scope of the appended claims.

What is claimed is:

1. A lightweight luggage carrier for bicycles having an inverted V-shaped portion, one leg of which is connected to a head post and the other leg connected to a seat, and a horizontal bar interconnecting the other leg and the head post at a position above its connection to said one leg comprising in combination:

a backing strip of flexible material adapted to be folded over the horizontal bar of the frame of the bicycle and forming juxtapositioned panels, said panels substantially filling and fitting the open space of the V-shaped portion of the frame, means arranged along the juxtapositioned edges of the material forming panels for engaging over the legs of the V-shaped portion of the frame of the bicycle for releasably securing the carrier to the bicycle, means formed on the apexes of said panels for closing the space formed between said panels, an opening through one of said panels for providing an access to the interior of the carrier, and means for detachably closing said opening, whereby the carrier is utilized for transporting said luggage in its interior.

2. The lightweight luggage carrier set forth in claim 1 wherein:

said means formed along the juxtapositioned edges of the material forming said panels comprises a plurality of spaced eyelets and a cord laced through said eyelets for detachably securing said carrier to the bicycle.

3. The lightweight luggage carrier set forth in claim 1 wherein:
a part of said means arranged along the juxtapositioned edges of the material forming said panels engages around the head post.

4. The lightweight luggage carrier set forth in claim 1 in further combination with:
a pocket secured to the outside surface of said other of said panels.

5. The lightweight luggage carrier set forth in claim 1 wherein:
said backing strip comprises canvas.

6. The lightweight luggage carrier set forth in claim 1 wherein:
said backing strip comprises leather.

7. The lightweight luggage carrier set forth in claim 1 wherein:
said backing strip comprises a plastic material.

* * * * *